(12) United States Patent
Eckstein

(10) Patent No.: US 10,536,394 B2
(45) Date of Patent: Jan. 14, 2020

(54) RESOURCE ALLOCATION

(71) Applicant: Hewlett Packard Enterprise Development LP, Houston, TX (US)

(72) Inventor: Denise Marie Eckstein, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 254 days.

(21) Appl. No.: 15/327,302

(22) PCT Filed: Jan. 26, 2015

(86) PCT No.: PCT/US2015/012926
§ 371 (c)(1),
(2) Date: Jan. 18, 2017

(87) PCT Pub. No.: WO2016/122448
PCT Pub. Date: Aug. 4, 2016

(65) Prior Publication Data
US 2017/0187644 A1    Jun. 29, 2017

(51) Int. Cl.
*H04L 12/911* (2013.01)
*H04L 12/24* (2006.01)
*H04L 29/08* (2006.01)

(52) U.S. Cl.
CPC ........ *H04L 47/783* (2013.01); *H04L 41/0893* (2013.01); *H04L 67/10* (2013.01)

(58) Field of Classification Search
CPC .... H04L 47/783; H04L 67/10; H04L 41/0893
USPC ........................................................ 709/226
See application file for complete search history.

(56) References Cited

U.S. PATENT DOCUMENTS

| | | | |
|---|---|---|---|
| 6,865,393 B1 | 3/2005 | Baum | |
| 7,181,519 B2 | 2/2007 | Pillai | |
| 7,873,441 B2 | 1/2011 | Synesiou | |
| 10,122,593 B2 * | 11/2018 | Vul | H04L 29/06 |
| 2002/0091814 A1 * | 7/2002 | Arendt | G06F 9/5061 |
| | | | 709/223 |
| 2005/0022047 A1 * | 1/2005 | Chandrasekaran | |
| | | | G06F 16/2343 |
| | | | 714/5.11 |
| 2007/0266083 A1 | 11/2007 | Kobashi | |

(Continued)

OTHER PUBLICATIONS

A. Alba et al, "Efficient and agile storage management in software defined environments," Mar. 2014, 12 Pgs., <http://rboutaba.cs.uwaterloo.ca/Courses/CS856-F14/Papers/06798748.pdf >.

(Continued)

*Primary Examiner* — Chris Parry
*Assistant Examiner* — Weiwei Y Stiltner
(74) *Attorney, Agent, or Firm* — Hewlett Packard Enterprise Patent Department

(57) ABSTRACT

An example system includes one or more users, each user having an allocation of each of one or more resources; and one or more resource brokers, each of the one or more users being associated with one of the one or more resource brokers. A first resource broker of the one or more resource brokers, upon detecting an insufficient allocation of a resource to an associated user, obtains additional allocation of the resource from another user of the one or more users through a second resource broker associated with the another user.

17 Claims, 5 Drawing Sheets

(56) References Cited

U.S. PATENT DOCUMENTS

| | | | |
|---|---|---|---|
| 2007/0266136 A1* | 11/2007 | Esfahany | H04L 41/022 709/223 |
| 2008/0229320 A1* | 9/2008 | Ueda | G06F 9/5038 718/104 |
| 2008/0313642 A1* | 12/2008 | Karaoguz | G06F 9/5027 718/104 |
| 2009/0094365 A1* | 4/2009 | Orady | G06F 15/173 709/226 |
| 2009/0119673 A1 | 5/2009 | Bubba | |
| 2010/0110886 A1 | 5/2010 | Sorri | |
| 2010/0205304 A1* | 8/2010 | Chaturvedi | H04L 61/2015 709/226 |
| 2010/0211680 A1* | 8/2010 | Chatterton | G06F 9/5011 709/226 |
| 2011/0235592 A1* | 9/2011 | Hoefel | H04L 67/42 370/329 |
| 2013/0262250 A1* | 10/2013 | Lingafelt | G06Q 30/06 705/26.1 |
| 2013/0279508 A1* | 10/2013 | Kano | H04L 45/742 370/392 |
| 2014/0013153 A1 | 1/2014 | Chittigala | |
| 2014/0280972 A1* | 9/2014 | Calippe | H04L 67/1012 709/226 |
| 2014/0282611 A1 | 9/2014 | Campbell | |
| 2014/0317280 A1* | 10/2014 | Ke | H04L 43/0882 709/224 |
| 2015/0304372 A1* | 10/2015 | Catz | H04M 3/22 709/204 |
| 2015/0343306 A1* | 12/2015 | Bentdahl | A63F 13/323 463/31 |
| 2016/0034359 A1* | 2/2016 | Cabrera | G06F 11/1464 714/19 |
| 2016/0073266 A1* | 3/2016 | Saha | H04W 16/04 370/329 |
| 2016/0119278 A1* | 4/2016 | Madan | H04L 61/2046 709/245 |

OTHER PUBLICATIONS

International Searching Authority, the International Search Report and the Written Opinion, PCT/US2015/012926, dated Oct. 23, 2015, 11 Pgs.

* cited by examiner

RESOURCE ALLOCATION

BACKGROUND

Computer systems and computer networks include a variety of resources. The resources may include various hardware or software components. The hardware resources may include storage and computing devices, and the software resources may include various applications or services, for example. Additional resources may include internet protocol (IP) addresses, for example, Resources may be allocated to a user at, for example, a starting point of a system (e.g., a launch or boot-up of the system). A user's allocation may be randomly assigned or may be based on a predicted usage, for example.

BRIEF DESCRIPTION OF THE DRAWINGS

For a more complete understanding of various examples, reference is now made to the following descriptions taken in connection with the accompanying drawings in which.

DETAILED DESCRIPTION

Various examples described below provide a federation of users in which responsibility for re-allocation of resources is shared by the users, rather than by an administrator. Placing responsibility for allocation of resources (e.g., transfer of an allocation of resources between users) with the various users eliminates the inefficiencies associated with each re-allocation going through an administrator. Further, a possible single point of failure (e.g., the administrator) is removed from the process of re-allocation of resources.

Figure 1:
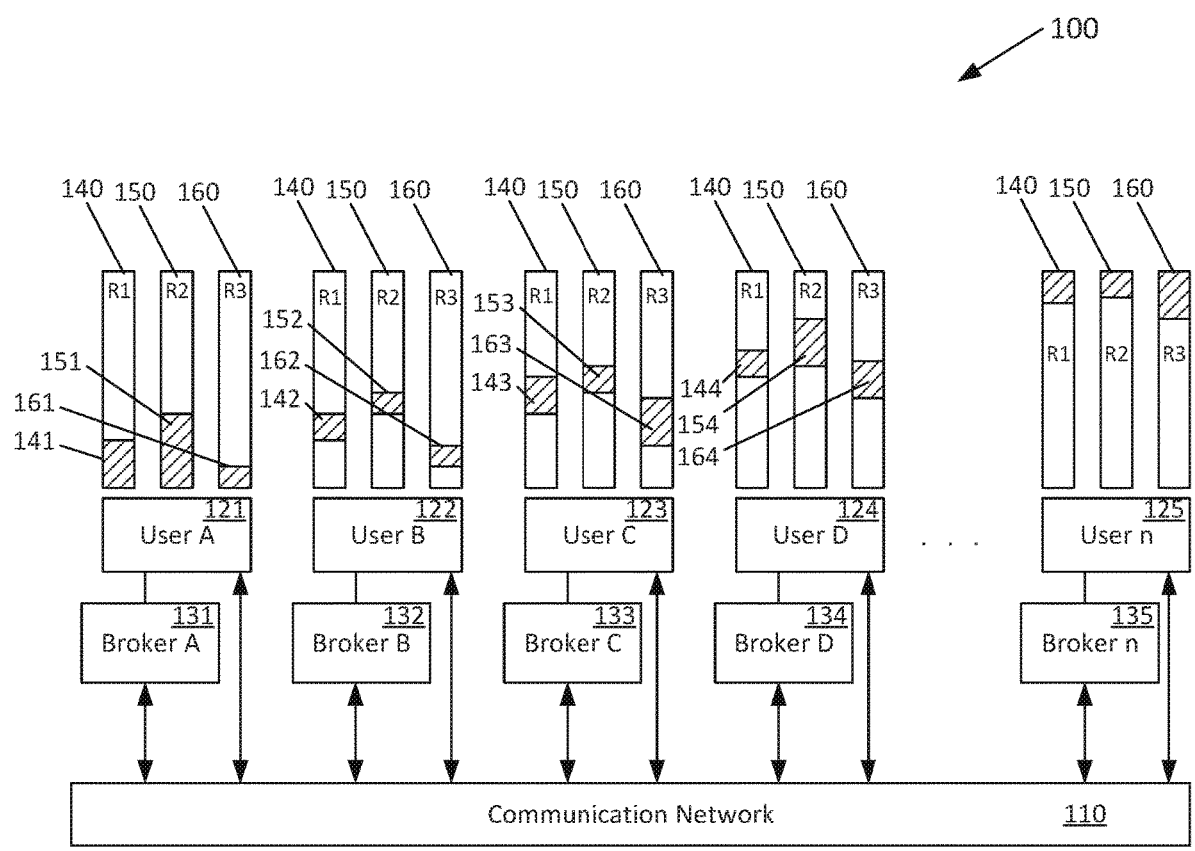
FIG. 1 is a schematic illustration of an example resource federation.

Referring now to FIG. 1, an example resource federation is schematically illustrated. The example resource federation 100 includes a communication network 110 which allows various entities in the example federation 100 to communicate with one another. In various examples, the communication network 110 may take the form of a public network, such as the Internet, or a private intranet network. In other examples, the communication network 110 may be replaced with, for example, a dedicated communication bus. Of course, various other arrangements for providing communication between the various entities are possible and are contemplated within the scope of the present disclosure.

The example federation 100 may include any number of users, such as users 121-125. In various examples, the users 121-125 may include computing devices, such as management processors, servers, laptops, desktops, smart phones, personal digital assistants or the like. The users 121-125 may also include user accounts which may be accessed through one or more computing devices, for example.

Each user 121-125 may be provided with an allocation of each of one or more resources. In the illustrated example of FIG. 1, each user 121-125 of the example federation 100 is provided with an allocation of each of three resources 140, 150, 160, In various examples, the resources 140, 150, 160 may include any of a variety of resources such as, for example, hardware or software. As a non-limiting example, the resources 140, 150, 160 may include physical storage memory, licenses for use of software packages, and internet protocol (FP) addresses, Various other types of resources are possible and are contemplated within the scope of the present disclosure.

Each user 121-125 in the example federation 100 of FIG. 1 may be provided with a certain allocation of each resource. For example, each user 121-125 may be provided with an allocation of a physical storage memory which may be a portion of a large-capacity storage device, an allocation of licenses which may include a certain number of user licenses, or IP addresses which may include a range of addresses which are a subset of the entire range of addresses available to the example federation 100.

An initial allocation of each resource 140, 150, 160 may be provided to each user by, for example, an administrator (not shown in FIG. 1). In the example of FIG. 1, User A 121 is provided with an al location 141 of Resource 1 140, an allocation 151 or Resource 2 150, and an allocation 161 of Resource 3 160. Similarly, User B 122 is provided with an allocation 142 of Resource 1 140, an allocation 152 or Resource 2 150, and an allocation 162 of Resource 3 160; User C 123 is provided with an allocation 143 of Resource 1 140, an allocation 153 or Resource 2 150, and an allocation 163 of Resource 3 160; and so forth.

In accordance with various examples, in some cases, a user 121-125 may require additional capacity of a particular resource. For example, User A 121 may run low on the amount of storage space available to it, develop a need for additional IP addresses or otherwise need additional allocation of a resource. Various examples of the present disclosure provide for users in such cases to obtain additional allocation from other users in the federation without the involvement of an administrator to re-allocate the resources. Instead, responsibility for allocation of resources, including transfer of allocation of resources between users, may be shared by the users.

In this regard, as illustrated in the example of FIG. 1, each user 121-125 of the example federation 100 may be associated with a resource broker 131-135, respectively, to facilitate the allocation of resources among the users 121-125. Each resource broker 131-135 may have the ability to request from other users through a resource broker 131-135 associated with the other users 121-125. Thus, each resource broker 131-135 may transfer or allocate resources to a user 121-125 associated with the resource broker 131-135.

In various examples, the resource brokers 131-135 may be separate entities from the users 121-125, as illustrated in the example of FIG. 1. In other examples, each resource broker 131-135 may be a service that is a part of each user 121-125. In this regard, the resource broker 131-135 may be a service running on a processor associated with the user 121-125. As illustrated in the example of FIG. 1, each resource broker 131-135 is associated with a single user 121-125. Conversely, each user 121-125 may be associated with a single dedicated resource broker 131-135. In other examples, a service broker 131-135 may support multiple users 121-125.

Figure 2:
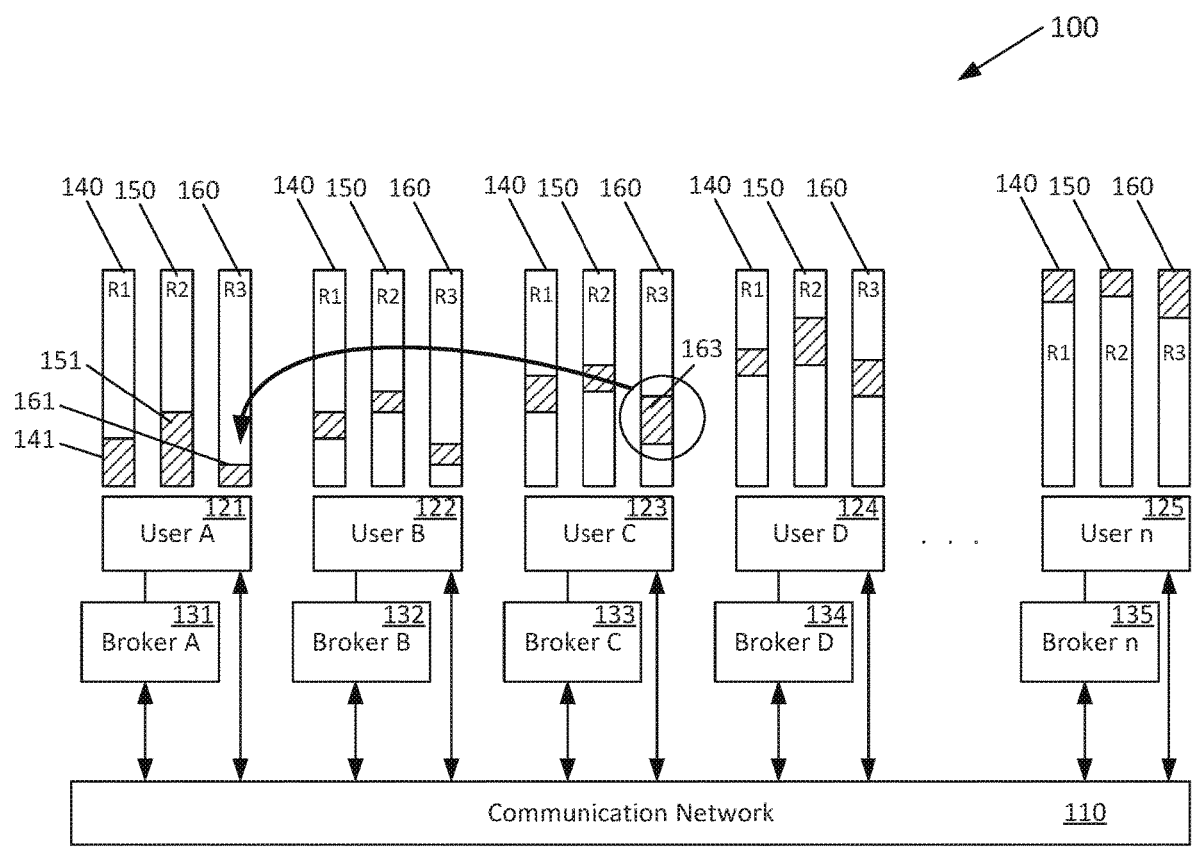
FIGS. 2 and 3 schematically illustrate an example transfer of an allocation of a resource in the example resource federation of FIG. 1.
Figure 3:
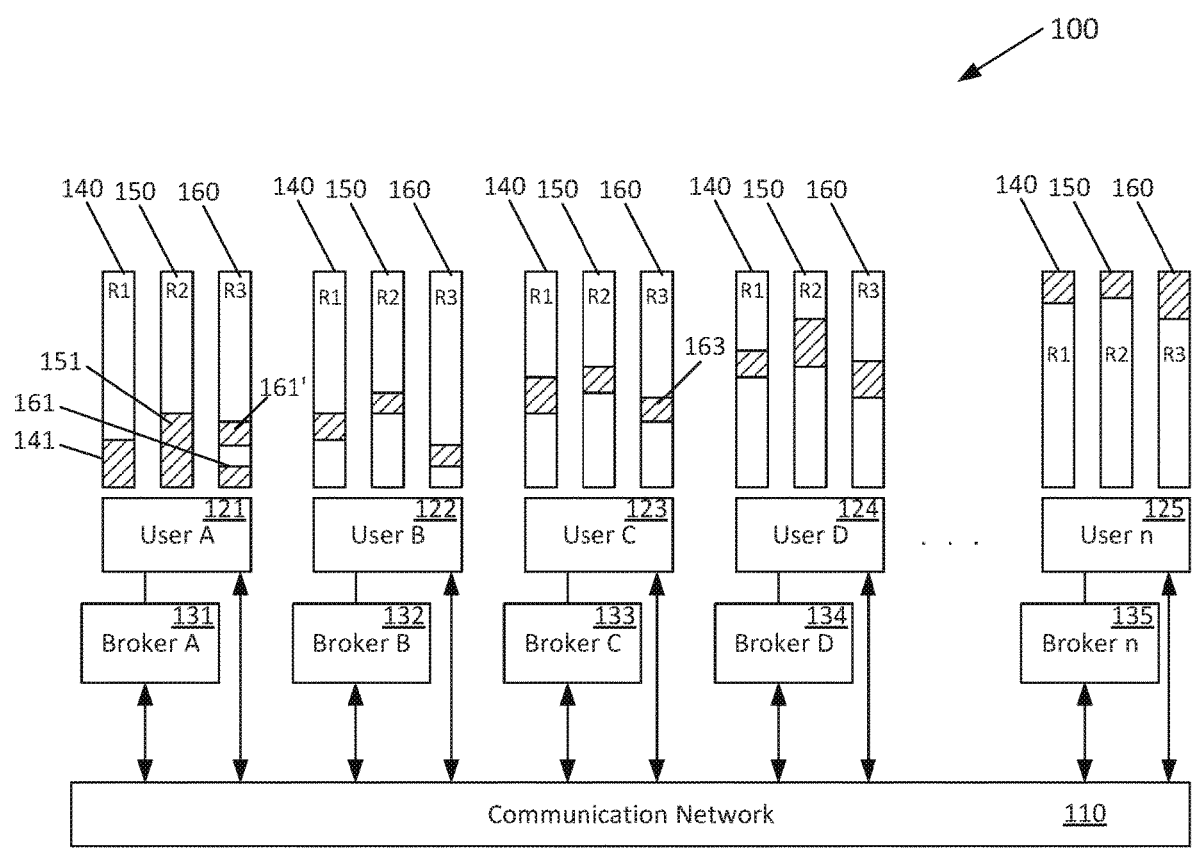

Referring now to FIGS. 2 and 3, an example transfer of an allocation of a resource in the example federation 100 of FIG. 1 is schematically illustrated. In the example of FIG. 2, User A 121 may develop a need for an additional allocation of Resource 3 160. For example, the allocation 161 of Resource 3 160 allocated to User A 121 may be a range of IP addresses. The insufficiency of the allocation 161 of Resource 3 160 of User A 121 may be resolved by transfer of allocation from another user, such as User C 123. In this regard, at least a portion of the allocation 163 of Resource 3 160 of User C 123 may be transferred to User A 121. As illustrated in FIG. 3, in some examples, only a portion of the allocation 163 may be transferred from User C 123, leaving User C 123 with a reduced allocation 163 of Resource 3 160. The transfer of the allocation may result in User A having its original allocation 161, as well as a transferred allocation 161', of Resource 3 160. In various examples, any portion or all of the allocation of one user (e.g., User C 123) may be transferred to another user (e.g., User A 121).

As noted above, in various examples, the transfer of an allocation of a resource may be achieved without the involvement of an administrator. In this regard, responsibility for allocation of the resources may be shared by the various users 121-125 of the example federation 100. For example, when a user runs low on, or anticipates a greater need for, a particular resource, that user may arrange or negotiate obtaining additional allocation of the resource from another user. In some examples, the user may negotiate an exchange of allocation of resources. For example, a first user may transfer one resource to a second user, and the second user may transfer another resource to the first user. In other examples, the transfer of allocation of resources may flow in only one direction.

In accordance with various examples, as described above, the transfer of an allocation is facilitated by a resource broker, such as resource brokers 131-135, associated with a user. Each resource broker 131-135 associated with a user 1 1-125 may be a service which provides communication with other resource brokers 131-135 associated with other users 121-125 to obtain an allocation of resources.

In the example of FIGS. 2 and 3, the Broker A 131 associated with User A 121 may detect that an allocation 161 of a resource 160 to User A 121 is insufficient. In various example, various parameters or policies may be used to determine insufficiency of a parameter. For example, if the resource is physical memory storage, insufficiency of the allocation may be triggered when there is less than a certain amount or percentage of the allocation that is free. As a further example, if the resource includes licenses for a software package, insufficiency may be detected when more than the allocated number of licenses is attempted for use. Those skilled in the art will appreciate that, depending on the nature of the resource, various parameters and values of the parameters may be used to trigger detection of an insufficiency of the allocation.

In some examples, the detection of the insufficiency by the resource broker may include monitoring of usage of the resource by the resource broker. In the example of FIGS. 2. and 3, the Broker A 131 may monitor usage of the resource 160 by User A 121. The Broker A 131 may use policies or thresholds to trigger an insufficiency detection based on the usage of the resource 160.

In other examples, the detection of the insufficiency by the resource broker may be based on a signal from the user (e.g., an alert from the user or a processor of a device associated with the user). Again, the user may base the signal on various policies, parameters and/or values of the parameters that relate to the resource and the user's allocation of that resource.

Referring again to the example of FIGS. 2 and 3, upon detection of the insufficiency of the allocation 161 of the resource 160 by Broker A 131, Broker A 131 may identify another user in the federation 100 which may have excess allocation of the same resource 160. In this regard, Broker A 131 may poll other brokers 132-135 that are associated with the other users 122-125 of the federation 100. In one example, Broker A 131 may send a broadcast signal identifying the resource for which allocation is sought.

In another example, each broker 131-135 may regularly monitor the availability of resources from each user in the federation. For example, Broker A 131 may poll each of the other brokers 132-135 to obtain usage and allocation values for each resource 140, 150, 160 at each user 122-125 at regular intervals. In this regard, Broker A 131 may easily identify a candidate user 122-125 with excess allocation of a resource.

Broker A 131 may then facilitate transfer of the allocation of the resource 160 from the identified user with excess allocation to User A 121. In the example of FIGS. 2 and 3, Broker A 131 may identify User C 123 as having excess allocation 163 of Resource 3 160. As noted above, at least a portion of the allocation 163 of Resource 3 160 of User C 123 may be transferred to User A 121. The transfer of the allocation may result in User C 123 having a reduced allocation 163 of Resource 3 160. The transfer of the allocation may result in User A having its original allocation 161, as well as a transferred allocation 161', of Resource 3 160.

The transfer of allocation of a resource may be governed by one or more rules or policies. In one example, transfer of allocation is governed by transfer size policy. In this regard, the policy may dictate a minimum and/or maximum amount of allocation of each resource that may be transferred between users. For example, in the case of IP addresses, each transfer of allocation may be limited to no more than ten addresses.

In another example, transfer of an allocation of a resource may be governed by a reserved-capacity policy. In this regard, a transfer of an allocation may be limited to ensure that the user from which an allocation is being transferred (e.g., User C 123 in the example of FIGS. 2 and 3) retains a predetermined minimum amount of allocation of the resource. Such a policy may prevent a user from giving up too much of an allocation, thereby reducing the likelihood that another transfer will be required when that user later needs an allocation of that resource.

Similarly, the reserved-capacity policy may limit a transfer of the allocation to ensure that the user to which an allocation is being transferred (e.g., User A 121 in the example of FIGS. 2 and 3) does not, intentionally or unintentionally, horde allocation of a resource. In this regard, the reserved-capacity policy may place an upper limit on the amount of allocation of each resource a single user may have.

In another example, transfer of an allocation of a resource may be governed by a policy which limits which users may exchange resources. For example, in some cases, one set of users within a federation may belong to a first organization, while another set of users within the same federation may belong to a second organization. In accordance with the policy, users in the first organization may only exchange resources with other users in the same organization, but may not be allowed to exchange resources with users in the second organization. In one example, the limitation may apply to only certain resources. For example, users in the first organization may exchange allocation of IP addresses with only users in the same organization, but may exchange physical memory storage allocation with users in the first or second organizations.

Figure 4:
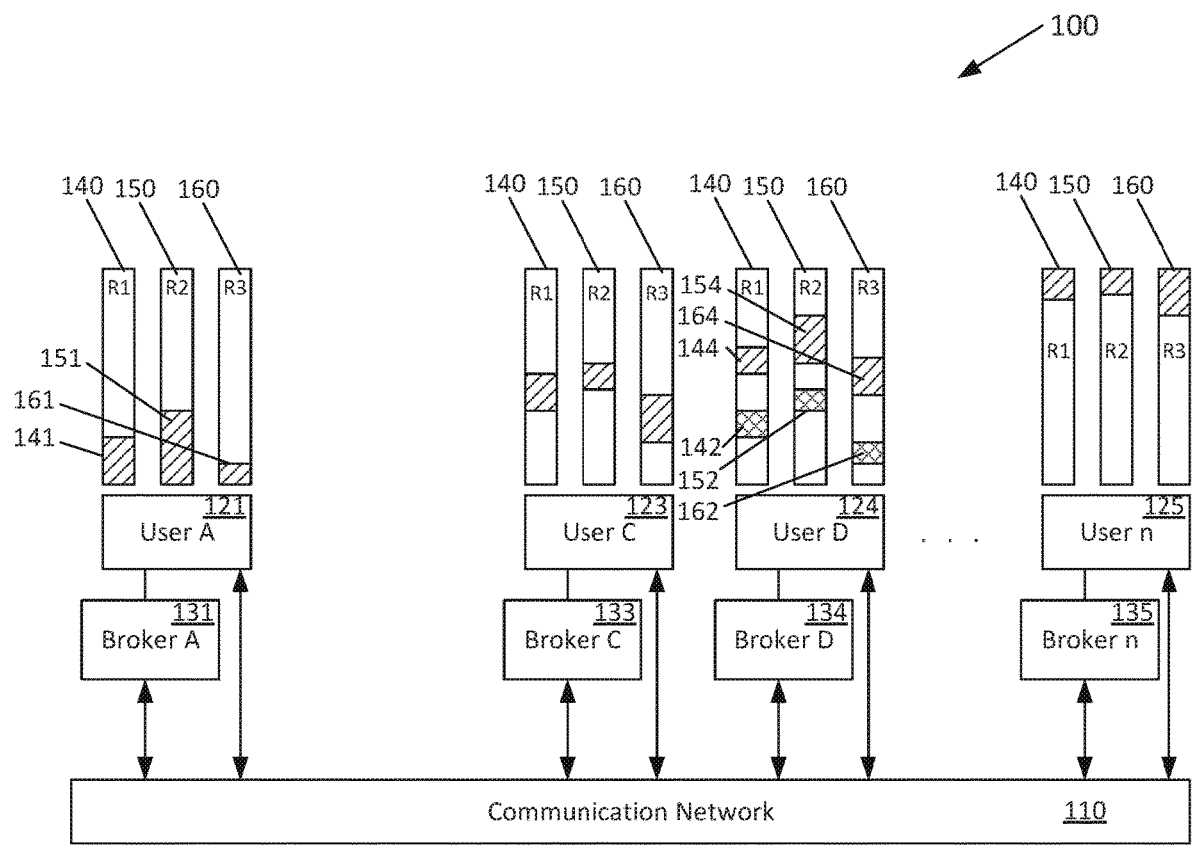
FIG. 4 schematically illustrates the example resource federation of FIG. 1 with a user leaving the example federation.

Referring now to FIG. 4, an example illustrates a case in which one of the users 121-125 leaves the example federation 100. In the example illustrated in FIG. 4, User B 122 is shown removed from the example federation 100. Removal of a user, such as User B 122, may be the result of a variety of scenarios. For example, User B 122 may have left an organization, thus requiring removal from the example federation 100. In other examples, the removal of a user may be the result of a larger re-organization of the example federation 100.

When a user, such as User B 122, leaves a federation, the allocation of resources belonging to that user may remain in the example federation. In one example, the allocation of the resources of User B 122 may be transferred, either in part or in entirety, to one of the other users. In the example illustrated in FIG. 4, the entirety of the allocation of each resource of User B 122 is transferred to another user, User 124. In various examples, a user to which the allocation is to be transferred may be selected based on one or more policies. For example, the selection may be based on which user is currently using the largest percentage of its allocated resources. This may be indicative of a user which is approaching a threshold for detection of an insufficiency of an allocation, for example.

In one example, upon the departure of a user, ownership of the allocation of resources of that user is transferred to another user. For example, in the example of FIG. 4 described above, the allocations 142, 152, 162 of User B 122 are transferred in their entirety to User D 124. User D 124 now becomes the owner of those allocations. In another example, the allocations 142, 152, 162 of User B 122 may be assigned to User D 124, but the allocations may be maintained in a quarantine. In this regard, ownership of the allocations 142, 152, 162 is not transferred to User D 124 but remains with the departing User B 122 Quarantine allows ongoing tracking of the allocations 142, 152, 162 within the federation 100. If User B 122 returns and rejoins the example federation 100 with allocations 142, 152, 162, the quarantined representations of these allocations may be dropped by User D 124.

Figure 5:
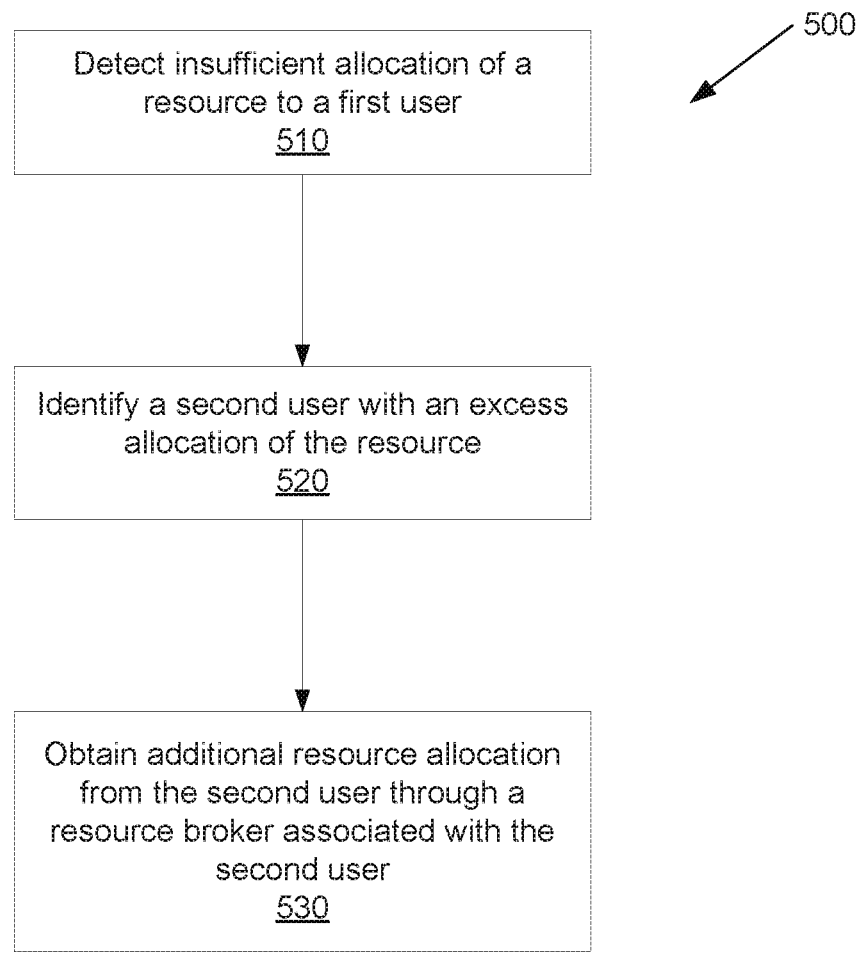
FIG. 5 illustrates an example method for resource allocation.

Referring now to FIG. 5, an example method for resource allocation is illustrated. In accordance with the various examples described herein, the method 500 of FIG. 5 may be performed by a broker 131-135 of the example federation 100. The method 500 includes detecting an insufficient allocation of a resource to a first user (block 510). As described above with reference to FIGS. 2 and 3, the detection of the insufficiency may be based on a determination by the broker 131-135 or on a signal received from the user 121-125, for example. Further, as also noted above, the triggering of the insufficiency may be based on a policy, various parameters and/or values of certain parameters.

Upon detecting the insufficiency of the allocation to the first user, the resource broker 131-135 associated with the first user may identify a second user with an excess allocation of the resource (block 520). As noted above, in some examples, the resource broker 131-135 associated with the first user may poll other brokers 131-135 that are associated with other users 121-125 for availability of an excess allocation of the resource.

The resource broker 131-135 associated with the first user may then obtain additional resource allocation from a second user through a resource broker 131-135 associated with the second user. In this regard, the resource broker 131-135 may facilitate transfer of an allocation of a resource to the first user. As described above, transfer of an allocation between users may be governed by one or more policies, such as a transfer size policy, a reserved-capacity policy, or a policy which limits which users may exchange resources. Of course, those skilled in the art will appreciate that a variety of other policies are possible and are contemplated within the scope of the present disclosure.

Thus, various examples described herein provide an efficient management of resources in a federation of users without the need for administrator involvement. Responsibility for allocation of resources (e.g., transfer of an allocation of resources between users) is shared by the various users. This eliminates the inefficiencies associated with each re-allocation going through an administrator. Further, a possible single point of failure (e.g., the administrator) is removed from the process of re-allocation of resources.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

The various examples set forth herein are described in terms of example block diagrams, flow charts and other illustrations. Those skilled in the art will appreciate that the illustrated examples and their various alternatives can be implemented without confinement to the illustrated examples. For example, block diagrams and their accompanying description should not be construed as mandating a particular architecture or configuration.

What is claimed is:

1. A system, comprising:
   a processor;
   a memory resource storing machine-readable instructions to cause the processor to:
   detect, via a first resource broker corresponding to a first computing device of a plurality of computing devices, an insufficient allocation of a first portion of a shared pool of computing resources, allocable among the plurality of computing devices, to the first computing device;
   obtain, via an exchange brokered between the first resource broker and a second resource broker corresponding to a second computing device of the plurality of computing devices, a reallocation of a second portion of the shared pool of computing resources, initially allocated to a second computing device, from the second computing device to the first computing device;
   detect a third computing device of the plurality of computing devices leaving a federation of the plurality of computing devices;
   transfer a third portion of the shared pool of user application licenses from the third computing device to a quarantine reserve responsive to the detection of the third computing device leaving the federation; and
   transfer a third portion of the shared pool of user application licenses from the quarantine reserve back to the third computing device responsive to detecting the third computing device rejoining the federation.

2. The system of claim 1, wherein the first resource broker corresponds to a first user profile and the second resource broker corresponds to a second user profile.

3. The system of claim 1, wherein the instructions to detect the insufficient allocation include instructions to detect the insufficient allocation based on a comparison of the first portion of the shared pool of computing resources to a threshold amount of the computing resource to be available for use at the first computing device.

4. The system of claim 1, wherein the instructions to detect the insufficient allocation include instructions to detect the insufficient allocation based on a notification from a user corresponding to the computing device.

5. The system of claim 1, wherein the exchange between the first resource broker and the second resource broker includes an exchange of a third portion of the shared pool of computing resources allocated to the first computing device from the first computing device to the second computing device in exchange for the second portion of the shared pool of computing resources.

6. The system of claim 1, wherein terms of the exchange governed by a computing resource type-specific policy.

7. The system of claim 1, wherein the shared pool of computing resources includes a shared pool of Internet Protocol (IP) addresses.

8. The system of claim 1, wherein the shared pool of computing resources includes a shared pool of user application licenses.

9. The system of claim 1, wherein the shared pool of computing resources includes a shared pool of storage on a shared storage device.

10. The system of claim 1, including instructions to:
transfer a third portion of the shared pool of computing resources from a third computing device of the plurality of computing devices responsive to detecting the third computing device has left a federation of the plurality of computing devices; and
transfer the third portion of the shared pool of computing resources back to the third computing device responsive to detecting that the third computing device has returned to the federation of the plurality of computing devices.

11. A method, comprising:
detecting an insufficient allocation of a first range of Internet Protocol (IP) addresses, from a shared pool of IP addresses allocated among a plurality of computing devices, allocated to a first computing device through a resource broker corresponding to the first computing device;
identifying, through the resource broker corresponding to the first computing device, a second computing device with an excess allocation of a second range of IP addresses;
obtaining, through a resource broker corresponding to the second computing device, a reallocation of a portion of the second range of IP addresses from the second computing device to the first computing device;
detecting a third computing device of the plurality of computing devices leaving a federation of the plurality of computing devices;
transferring a third portion of the shared pool of user application licenses from the third computing device to a quarantine reserve responsive to the detection of the third computing device leaving the federation; and
transferring the third portion of the shared pool of user application licenses from the quarantine reserve back to the third computing device responsive to detecting the third computing device rejoining the federation.

12. The method of claim 11, including determining whether to permit the reallocation of the portion of the second range of IP addresses based on a comparison of a resulting total amount of IP addresses allocated to the first computing device to a limit of IP addresses allocable to the first computing device.

13. The method of claim 11, including determining whether to permit the reallocation of the portion of the second range of IP addresses based on a comparison of a resulting total amount of IP addresses allocated to the second computing device to a reserve IP address capacity threshold established for the second computing device.

14. The method of claim 11, including determining whether to permit the reallocation of the portion of the second range of IP addresses based on a comparison of an amount of IP addresses to be reallocated in the portion of the second range of IP addresses to a threshold amount of IP addresses allocable in an exchange between computing devices.

15. The method of claim 11, including identifying the second computing device with an excess allocation of a second range of IP addresses by broadcasting a signal, from the resource broker corresponding to the first computing device, requesting an allocation of additional IP addresses.

16. A non-transitory computer-readable medium containing instructions executable by a processor to cause the processor to:
detect an insufficient allocation of a first portion of a shared pool of user application licenses allocated to a first computing device;
identify a second computing device with an excess allocation of a second portion of the shared pool of user application licenses;
obtain a reallocation of the second portion of the shared pool of user application licenses from the second computing device to the first computing device through a resource broker associated with the second computing device;
detect a third computing device of the plurality of computing devices leaving a federation of the plurality of computing devices;
transfer a third portion of the shared pool of user application licenses from the third computing device to a quarantine reserve responsive to the detection of the third computing device leaving the federation; and
transfer the third portion of the shared pool of user application licenses from the quarantine reserve back to the third computing device responsive to detecting the third computing device rejoining the federation.

17. The non-transitory computer-readable medium of claim 16, including instructions to transfer a third portion of the shared pool of user application licenses from the third computing device to the first computing device responsive to the detection of the third computing device leaving the federation.

* * * * *